United States Patent

Tominaga

[11] Patent Number: 5,862,904
[45] Date of Patent: Jan. 26, 1999

[54] LINE SYNCHRONIZING APPARATUS

[75] Inventor: Kanji Tominaga, Suzuka, Japan

[73] Assignee: Honda Giken Kogyo Kabushiki Kaisha, Tokyo, Japan

[21] Appl. No.: 665,449

[22] Filed: Jun. 18, 1996

[30] Foreign Application Priority Data

Jun. 21, 1995 [JP] Japan .................................. 7-154734

[51] Int. Cl.$^6$ .............................................. B65G 43/08
[52] U.S. Cl. .............................. 198/341.03; 198/341.07
[58] Field of Search .......................... 198/341, 341.03, 198/341.07

[56] References Cited

U.S. PATENT DOCUMENTS 4,453,303  6/1984  Leddet ..................................... 198/341
4,964,497  10/1990  Bundo et al. ........................... 198/341

*Primary Examiner*—William E. Terrell
*Assistant Examiner*—Mark Deuble
*Attorney, Agent, or Firm*—Gifford, Krass, Groh, Sprinkle, Patmore, Anderson & Citkowski,P.C.

[57] ABSTRACT

A line sychronizing apparatus includes a conveyer 1 for conveyance of a work, a first transport rail 2 mounted above and in parallel with the conveyer, a main assembly 10 slidably supported on the first transport rail by a plurality of rollers, a second transport rail 14 mounted in parallel with the conveyer, and an operating assembly P slidably supported by the second transport rail by a plurality of rollers. The apparatus prevents the heavy weight of the main body of the apparatus from being applied to the work. The apparatus performs each assembling operation in a synchronized condition while the work is being transported.

4 Claims, 2 Drawing Sheets

LINE SYNCHRONIZING APPARATUS

BACKGROUND OF THE INVENTION

1. Field of the Invention

The present invention relates to a line synchronizing apparatus capable of following such as a variety of works or assembly parts moving along a roller conveyer line.

2. Brief Description of the Prior Art

As an apparatus for providing an operation such as tightening or the like, in sychronization with a work moving along a production line, it is known a "Line Synchronization Apparatus" as disclosed in Japanese laid-open patent publication No. 62-153019 (Application No. 61-39794, 1986). Such an apparatus includes a synchronizing means disposed over and in parallel with a transport line and suspended downwardly therefrom; fastening means such as a nut runner provided on the lower side of the synchronizing means; and, in addition, engagement means provided on the lower end of the synchronizing means: whereby, as the work is conveyed along the line, the engagement means is lowered to engage with the work, the synchronizing means is turned to its operation condition, and therefore the synchronizing means, driven by the conveying force of the line, also travels following the work. Subsequently, the nut runner port is lowered to perform tightening operation during moving of the work.

However, there were problems in the foregoing construction, in the case that a roller conveyer is used as the conveyer. In such a case, the transport of the work is achieved by friction between surfaces of the roller and the work. On the other hand, the synchronizing means is formed to include therein a drive system for the fastening means, control means and also a housing structure therefor, thereby having a dimension of a large scale and of a heavy weight. Accordingly, especially in the case of a work having a light weight such as formed of aluminum, the friction between the rail and the synchronizing means is sometimes of a value very close to that between the roller and the work, and therefore the work would be undesirably kept as being untransported to cause trouble in the operation of the subsequent process.

SUMMARY OF THE INVENTION

In view of the above disadvantages, an object of the present invention is to prevent a heavy weight of the main body of the apparatus applied on the work while being transported, but merely the weight of the operating means alone is applied on the work, thereby preventing the work from being kept untransported on the conveyer line.

An object of the present invention is to provide a line sychronizing apparatus which comprises: a conveyer for conveyance of a work; a first transport rail mounted above and in parallel with said work conveyer; a main assembly slidably supported on said first transport rail by means of a plurality of rollers; a second transport rail 14 mounted in parallel with said work conveyer; and an operating assembly slidably supported by said second transport rail by means of a plurality of rollers.

The apparatus may further comprise a set of returning connection means including a motor, a connecting member and pulleys.

The apparatus may still further comprise, between the first transport rail and the main assembly depended from the rail, an engagement assembly for regulating the synchronizing position of the main assembly of the apparatus.

The work placed on the conveyer is engaged with the operating assembly which is slidably supported by the second transport rail, thus synchronizing the operating assembly with the movement of the work to move this operating assembly in accordance with rolling motion of the rollers. In addition, during the synchronizing motion of the operating assembly, the operating assembly can perform necessary operations on the work.

Since the main assembly is suspended from the first transport rail, the assembly can be moved to a necessary location where the inspection and maintenance of the exterior thereof is enabled.

Actuated by the electromotive returning connection means, the operating assembly is moved along the second rail to perform a necessary operation, and is returned to the initial location, where it is ready to perform the subsequent operation on the work.

Further, the main assembly may control the synchronizing assembly, through the engagement means which engages the first rail.

DETAILED DESCRIPTION OF THE PREFERRED EMBODIMENTS

Figure 1:
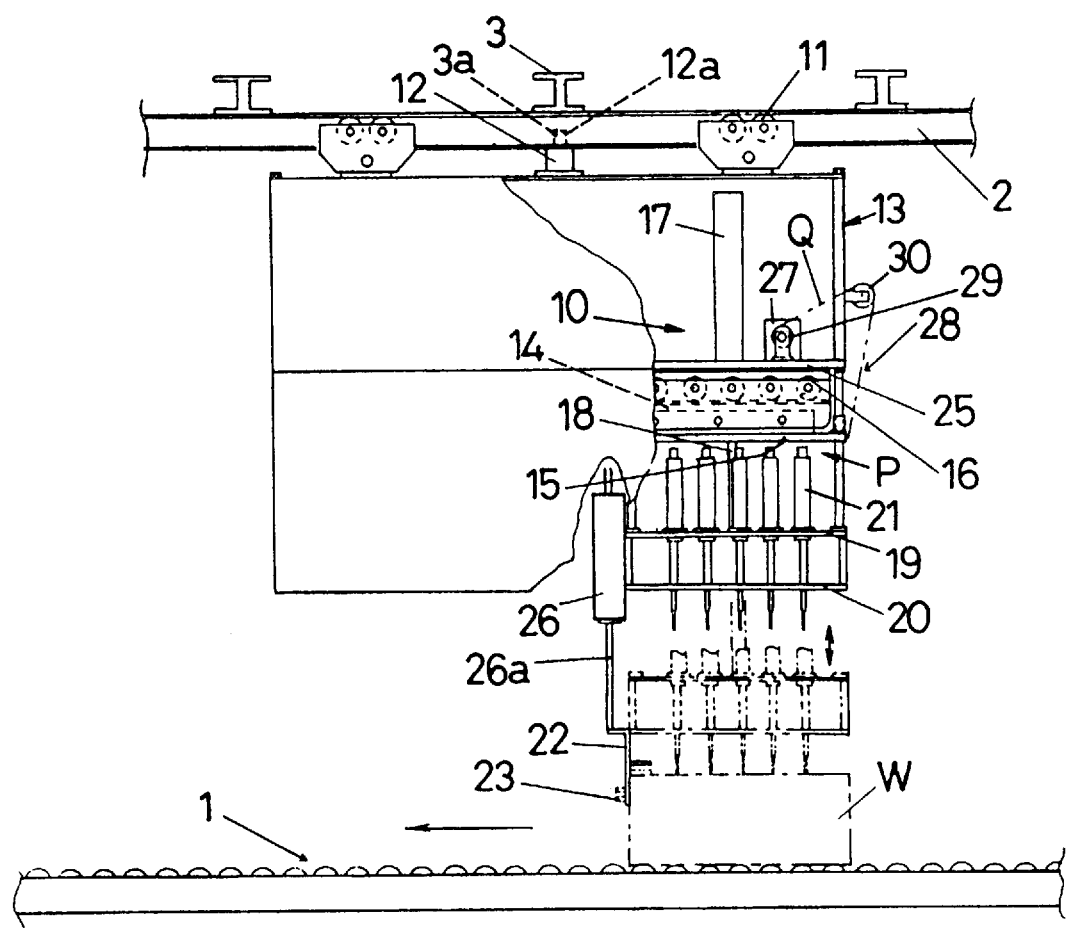
FIG. 1 is a partially broken side view of a line synchronizing apparatus according to an embodiment of the invention.
Figure 2:
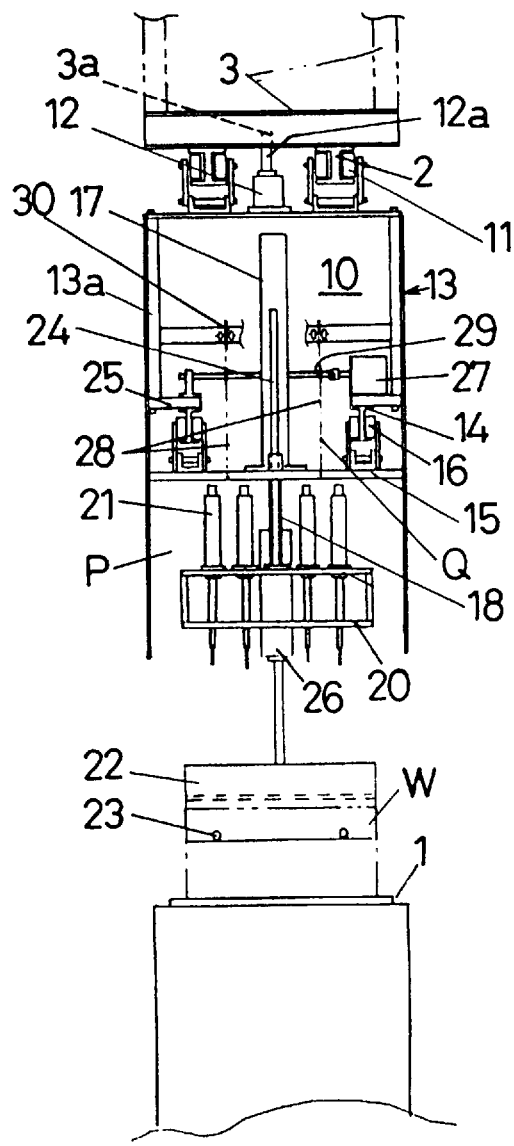
FIG. 2 is an end view of the apparatus of FIG. 1.

A first transport rail 2 is disposed in parallel with and above a roller conveyer 1. A synchronizing assembly 10, which actually functions as the main apparatus itself, is slidably supported by means of a plurality of rollers 11 so as to depend downwardly from the lower side of the first rail. Disposed on the upper frame 13 of synchronizing assembly 10 is an engagement assembly for regulating the synchronizing position of the synchronizing assembly 10. The engagement includes a stopper cylinder 12 having a rod 12a, which can be received in a positioning hole 3a formed in the support beam 3 for properly positioning the synchronizing assembly 10.

Disposed on both side frames 13a of the upper frame 13 are support plates 25, on each of the lower surfaces of which is provided a second transport rail 14. On the upper side of a base plate 15, there is mounted a plurality of rollers 16, which may be located on both sides of base plate 15 and rotatably engages the second rails 14. Mounted in the middle of the upper surface of base plate 15 is a cylinder 17 having a vertically movable rod member 18, which downwardly extends through base plate 15 and the end of which is secured to a support member 19 for the operating device such as a nut runner. Another vertically movable rod 24, also secured to support member 19 with its one end, upwardly extends with its other end through base plate 15. A support plate 20 for supporting the nut runner shaft is provided below the support member 19, and, through the support plate 20, the end of nut runner 21 is downwardly extended.

A cylinder 26 is secured to both the support member 19 and support plate 20 so as to be positioned on the advancing side of a work W with respect to the support plate 20, and is provided with a rod member 26a having a synchronizing plate 22 and a detection switch 23. Also, the cylinder 26 is normally in the state of being extended.

A motor 27 is placed on the support plate 25 on the side frame 13a. A pair of connecting members 28 such as chains are connected with their each one end to pulleys 29, respectively, and each of the other ends is connected to base plate 15, thus forming returning connection means Q.

In operation, a work which is placed on the roller conveyer 1 is conveyed in a predetermined direction, and reaches and engages the synchronizing plate 22 and the detection switch 23 detects the work W.

The detection signal is produced from detection switch 23 to actuate the vertically movable cylinder 17 to cause its rod 18 to downwardly extend to lower the support plate 19, thereby the end of nut runner 21 being engaged with the bolt on the associated portion of the work W to perform a necessary operation.

The work W is continuously transported in the engagement condition, while the operating assembly P (the nut runner station) is slidably moved along the second transport rail 14, thereby the operation such as bolt fastening is performed in the synchronized condition.

Upon completion of all operations, the cylinder 17 lifts up its rod 18 to raise the runner support 19 and releases the engagement between the nut runner 21 and the bolt associated with the work W. On the other hand, the cylinder 26 is actuated to raise the synchronizing plate 22 to release the work W to stop movement of operating assembly P. Then, a motor 27 of electromotive returning connection means Q is operated to wind up the extended two connecting strips 28 around the shaft pulley 29, thereby the rollers 16 sliding along the transport rail 14, and the operating assembly P is allowed to return to the initial raised position.

In addition, since the synchronizing assembly 10, which is suspended from first transport rail 2, is enabled to be movable along the rail 2 by way of the rollers 11 when the rod 12a of stopper cylinder 12 is released from the engagement with the positioning hole 3a of support beam 3, the modification of processes as well as inspection or correction of the apparatus are all enabled.

As described above, the invention provides a construction in the form having two separate conveyers including one disposed in the top position and the other in the lowered position; and also provides a separate construction including two components, one as an operating assembly including nut runners and another as a main assembly including the synchronizing apparatus, and each is formed as a separate component from the other. This provides an advantage over the conventional apparatus, such that merely the lower assembly would apply its gravity on the work, which is therefore extremely decreased.

In addition, the invention is also applicable for all the operations including hole boring, screw tightening or the like onto the work being transported along the conveyer.

What is claimed is:

1. A line synchronizing apparatus comprising:
    a conveyer for conveying a work in a predetermined direction;
    a first transport rail mounted above and in parallel with said conveyer;
    a main assembly slidably supported on said first transport rail by means of a plurality of rollers;
    a second transport rail mounted in parallel with said conveyer; and
    an operating assembly slidably supported by said second transport rail by means of a plurality of rollers; said operating assembly slidable in the predetermined direction, said operating assembly having a raised initial position wherein said operating assembly is stationary with respect to said main assembly, said operating assembly further having a lowered position wherein said operating assembly engages the work and slides in the predetermined direction with said work;
    said main assembly being held stationary with respect to said first transport rail when said operating assembly is in said lowered position by a means for regulating the position of said main assembly.

2. A line synchronizing apparatus according to claim 1, further including electromotive returning connection means provided between said main assembly and said operating assembly, said returning means comprising:
    a motor;
    a connecting strip; and
    a plurality of pulleys.

3. A line synchronizing apparatus according to claim 1, further comprising engagement means for regulating the synchronizing position of said main assembly, said engagement means is provided between said first transport rail and said main assembly.

4. A line synchronizing apparatus comprising:
    a roller conveyer for conveying a lightweight work;
    a first transport rail mounted above and in parallel with said conveyer;
    a main assembly slidably supported on said first transport rail by means of a plurality of rollers;
    a second transport rail mounted in parallel with said conveyer;
    an operating assembly slidably supported by said second transport rail by means of a plurality of rollers;
    an electromotive returning connection means provided between said main assembly and said operating assembly, said returning means comprising a motor, a connecting strip, and a plurality of pulleys; and
    an engagement means for regulating a synchronizing position of said main assembly, said engagement means provided between said first transport rail and said main assembly.

* * * * *